(12) United States Patent
Kuwabara

(10) Patent No.: US 6,248,290 B1
(45) Date of Patent: Jun. 19, 2001

(54) FUNCTIONALLY GRADIENT MATERIAL AND METHOD FOR PRODUCING THE SAME

(75) Inventor: Mitsuo Kuwabara, Tsurugashima (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/449,495

(22) Filed: Nov. 29, 1999

Related U.S. Application Data

(62) Division of application No. 09/044,869, filed on Mar. 20, 1998, now Pat. No. 6,037,066.

(30) Foreign Application Priority Data

| Mar. 21, 1997 | (JP) | 9-68768 |
| Mar. 21, 1997 | (JP) | 9-68774 |
| Mar. 28, 1997 | (JP) | 9-78059 |
| Apr. 3, 1997 | (JP) | 9-85277 |
| Apr. 16, 1997 | (JP) | 9-98655 |

(51) Int. Cl.$^7$ ............................................. B22F 7/02
(52) U.S. Cl. ............................. 419/6; 228/193; 228/203
(58) Field of Search ........................... 419/5, 6; 228/193, 228/203

(56) References Cited

U.S. PATENT DOCUMENTS

| 4,214,906 | * | 7/1980 | Langer et al. | |
| 4,783,368 | * | 11/1988 | Yamamoto et al. | 428/408 |
| 5,045,400 | * | 9/1991 | Esashi | 428/450 |
| 5,277,942 | * | 1/1994 | Ikegaya et al. | 428/332 |
| 5,303,763 | * | 4/1994 | Aghajanian et al. | 164/97 |
| 5,455,000 | * | 10/1995 | Seyferth et al. | 419/36 |
| 5,513,793 | * | 5/1996 | Malmgren | 228/193 |
| 5,574,314 | * | 11/1996 | Okada et al. | 257/828 |
| 5,637,406 | * | 6/1997 | Asai et al. | 428/469 |
| 5,744,411 | * | 4/1998 | Zhao et al. | 501/98.5 |
| 5,763,093 | * | 6/1998 | Casey et al. | 428/469 |
| 5,834,840 | * | 11/1998 | Robbins et al. | 257/705 |
| 5,874,175 | * | 2/1999 | Li | 428/457 |
| 5,904,993 | * | 5/1999 | Takeuchi et al. | 428/627 |

\* cited by examiner

*Primary Examiner*—Ngoclan Mai
(74) *Attorney, Agent, or Firm*—Birch, Stewart, Kolasch & Birch, LLP

(57) ABSTRACT

A functionally gradient material having desired characteristics without having any joining section is efficiently obtained by means of integration effected by a sintering treatment, the functionally gradient material comprising a metal part composition containing predetermined components based on a basic composition of tungsten and copper and a ceramic part composition containing predetermined components based on a basic composition of aluminum nitride and aluminum. Therefore, the metal and the ceramic are integrated into one unit without providing any joining section to give a high joining reliability and high thermal conductivity.

20 Claims, 3 Drawing Sheets

FUNCTIONALLY GRADIENT MATERIAL AND METHOD FOR PRODUCING THE SAME

This application is a divisional of application Ser. No. 09/044,869, filed on Mar. 20, 1998, now U.S. Pat. No. 6,037,066 the entire contents of which are hereby incorporated by reference.

BACKGROUND OF THE INVENTION

1. Field of the Invention

The present invention relates to a functionally gradient material comprising a metal part composition and a ceramic part composition and prepared in an integrated manner by means of a sintering treatment. The present invention also relates to a method for producing the functionally gradient material.

2. Description of the Related Art

In general, the semiconductor circuit is devised such that the semiconductor circuit is carried on a ceramic substrate to efficiently discharge the heat generated in the semiconductor circuit to the outside in order to stabilize semiconductor characteristics.

In such an arrangement, when the heat is generated from the semiconductor circuit in a relatively large amount, the ceramic substrate cannot sufficiently deal with the heat by itself. For this reason, a heat sink made of copper or aluminum is attached to the ceramic substrate by means of brazing or soldering. In the case of MPU and large capacity electric power IGBT, for example, an artifice is made so that a radiating fin is provided to forcibly release the heat.

The ceramic substrate is required to have high thermal conductivity in order to maintain characteristics of the semiconductor circuit at high levels. Further, the ceramic substrate is required to have insulation property, shielding property, and low dielectric property. On the other hand, the heat sink is also required to have high thermal conductivity. Usually, both of the ceramic substrate and the heat sink are designed to have a thermal conductivity of not less than 150 W/mK and have a coefficient of thermal expansion which is approximate to the coefficient of thermal expansion of the semiconductor chip.

However, the brazing material or the soldering material, which is used to join the ceramic substrate and the heat sink, has a coefficient of thermal expansion which is two-fold or more as compared with those of the ceramic substrate and the heat sink, and a coefficient of thermal conductivity which is not more than 20 W/mK to 70 W/mK. That is, the brazing material or the soldering material has a low value of the coefficient of thermal conductivity which is ½ to ⅐ as compared with those of the ceramic substrate and the heat sink. For this reason, the joining section, at which the brazing material or the soldering material is applied, has a low coefficient of thermal expansion. Further, the joining section undergoes large thermal expansion as compared with other sections. A problem is pointed out that a considerably large stress is generated at the joining section, and the reliability of joining is lowered.

Moreover, it is also feared that the heat tends to be accumulated in the joining section, and it is impossible to effectively exhibit the function of the heat sink. Therefore, it is necessary to provide a considerably large heat sink and a considerably large radiating fin so that a large thermal gradient is always maintained. As a result, a problem arises in that such an arrangement cannot respond to the requirement of miniaturization.

Recently, a functionally gradient material has been known, which is integrally provided with characteristics of the ceramic which is excellent, for example, in corrosion resistance, insulation performance, and high temperature durability and the metal which is excellent in toughness. Such a functionally gradient material is usually produced by preparing a laminated compact (including 10 or more layers, if necessary) in which the composition gradually differs, and molding the laminated compact into a predetermined shape, followed by application of a sintering treatment.

However, for example, the sintering temperature, the coefficient of thermal expansion, and the coefficient of thermal conductivity greatly differ between the metal and the ceramic. Therefore, the following problem is pointed out. That is, even if the lamination is made in multiple layers, when the metal and the ceramic are simultaneously sintered, then the ceramic part may remain green or non-sintered, the peeling may occur at the interface between the different compositions, or cracks and breakage may occur. For this reason, the conventional functionally gradient material is not suitable for practical use.

Moreover, in the case of the conventional functionally gradient material, the lamination is made in multiple layers while gradually changing the composition. For this reason, an inconvenience arises in that the moldable thickness is large, it is impossible to obtain any functionally gradient material which has a thin thickness, and hence the conventional functionally gradient material is inferior in performance of wide use. Further, the conventional functionally gradient material involves the following problem. That is, the production steps are complicated, the number of steps is large, and the production cost becomes expensive.

An additional problem is pointed out. That is, when the laminated compact has more multiple layers, the peeling tends to occur during the press molding at the interface at which the composition is changed, and it is impossible to obtain any stable shape. Further, in order to obtain a desired shape, it is necessary to use a large amount of organic additive. Therefore, an inconvenience arises in that the densification during sintering is inhibited, and the metal layer is badly affected.

Further, there is a difference in sintering temperature of 300° C. to 1000° C. between the metal and the ceramic. The densification for the ceramic part does not proceed at a densifying temperature for the metal layer. For this reason, if it is intended to apply heat up to a sintering temperature for the metal layer, the melting points of almost all metals are exceeded. As a result, a problem arises in that the softening takes place, and it is impossible to maintain the shape.

The densifying temperature region for the metal is greatly different from the densifying temperature region for the ceramic, and the coefficient of thermal conductivity and the thermal expansion of the former are greatly different from those of the latter. Therefore, the following problem is pointed out. That is, a large thermal stress occurs to cause warpage and breakage during the sintering, and hence the conventional functionally gradient material is not suitable for practical use.

SUMMARY OF THE INVENTION

A general object of the present invention is to provide a functionally gradient material and a method for producing the same having high joining reliability and high thermal conductivity, by integrating a metal and a ceramic into one unit without providing any joining section.

A principal object of the present invention is to provide a method for producing a functionally gradient material, which makes it possible to obtain the functionally gradient material in which a metal composition layer and a ceramic composition layer are tightly and reliably integrated into one unit, by means of simple production steps.

According to the present invention, there is provided a functionally gradient material composed of a metal part composition and a ceramic part composition, in which the coefficient of thermal expansion of the metal part is allowed to approximate to that of the ceramic part in the sintering region. Thus, it is possible to obtain, for example, a heat sink-integrated type ceramic substrate having desired performance.

Specifically, the ceramic part composition comprises a major component of aluminum nitride, which is required to satisfy that the coefficient of thermal expansion is up to $4 \times 10^{-6}$/k and the coefficient of thermal conductivity is not less than 150 W/mK, in order to directly carry a semiconductor chip thereon.

The metal part (heat sink) is also specified in conformity with the ceramic part to satisfy that the coefficient of thermal expansion is up to and approximate to $4 \times 10^{-6}$/k, and the coefficient of thermal conductivity is not less than 150 W/mK. The functionally gradient material is designed so that the metal part has a coefficient of thermal expansion approximate to that of the ceramic part in the sintering region (densifying region), and the both parts have the same sintering temperature region.

The dimensional contraction before and after the sintering is up to 20%. The contraction of the ceramic part is the same as those of the diffusion layer and the metal part during the sintering at the same temperature. The width of the region of the diffusion layer is designed to be at least 1 mm or more.

According to the present invention, the metal part composition comprises a basic composition of 75% to 90% of tungsten and 5% to 20% of copper.

When the tungsten and the copper are contained in the composition ranges described above respectively, then the coefficient of thermal expansion and the coefficient of thermal conductivity are 6 to $9 \times 10^{-6}$/k and 150 W/mK to 250 W/mK respectively. Thus, required qualities are obtained. From a viewpoint of the coefficient of thermal conductivity, it is preferable to increase the amount of copper. On the contrary, from a viewpoint of the coefficient of thermal expansion, it is desirable to increase the amount of tungsten and decrease the amount of copper. However, the composition ranges described above are set in order to construct the gradient material while allowing the coefficient of thermal expansion of the metal part to coincide with that of the ceramic part.

Addition of 0.3% to 1.5% of Aluminum:

Aluminum is added because the composition and the component of aluminum nitride contained in the ceramic part are not subjected to diffusion sufficiently quickly, and the diffusion distance thereof is not large. Aluminum forms intermetallic compounds together with tungsten and copper. Nitriding of such aluminum is delayed as compared with aluminum of the ceramic part. Accordingly, the densification proceeds to some extent, simultaneously with which there is a tendency that aluminum is accumulated at the inside from the surface layer of the metal part. If aluminum is added in an amount of less than 0.3%, no effect is found. On the other hand, if aluminum is added in an amount exceeding 1.5%, then the coefficient of thermal expansion of the metal part is increased, and the functionally gradient material is not obtained.

Addition of 0.05% to 1.5% of Silver:

Silver has a function to greatly contribute to the densification of the metal part. Tungsten and copper have low reactivities. Even when copper forms a liquid phase, tungsten is scarcely dissolved therein. Even when the sintering is performed in this state, then the densification is up to about 90% or less, and voids remain. When silver is added in such a situation, the silver facilitates the volume diffusion of tungsten and copper, and it is possible to achieve 100% of densification.

If silver is added in an amount of less than 0.05%, the effect cannot be obtained. On the other hand, if silver is added in an amount of up to about 3%, the effect of densification can be maintained, however, the decrease in sintering temperature is caused, and it becomes difficult to perform the simultaneous sintering together with the ceramic part. Moreover, if the amount of addition exceeds 1.5%, then the coefficient of thermal expansion becomes too large, and the cost becomes expensive. Therefore, the effective amount of addition of silver is in a range of 0.05% to 1.5%. It is preferable that silver is also added to the ceramic part to cause mutual diffusion.

Addition of 0.1 to 3% of at Least One of Iron, Nickel, and Cobalt

Iron, nickel, and cobalt are homologous elements, and they behave in approximately the same manner. These elements affect the strength of the obtained sintered compact, and they improve the reliability concerning the strength. If they are added in an amount of less than 0.1%, then the effect is not obtained, and the thermal conductivity is contrarily suppressed. On the other hand, when they are added in an amount exceeding 0.1%, then the strength is successfully increased, and the stability (stability of strength) of the sintered compact is improved. If they are added in an amount exceeding 3%, then the coefficient of thermal conductivity is greatly decreased, it is impossible to obtain the desired coefficient of thermal conductivity, and the coefficient of thermal expansion is also increased. Therefore, the amount of addition of these elements is set to be 0.1% to 3%.

Other Additive Elements:

Other additive elements include, for example, chromium, molybdenum, and vanadium. These elements principally function to improve the strength of the sintered compact, and they can be also used to adjust the coefficient of thermal expansion. In the case of any of the elements, the increase in strength is saturated at 1.5%, and the coefficient of thermal conductivity is decreased in proportion to the increase in amount of addition. Therefore, the amount of addition of these elements is set to be not more than 1.5%.

On the other hand, the ceramic part composition comprises a basic composition of 60% to 90% of aluminum nitride and 10% to 40% of aluminum.

In the composition ranges described above, the coefficient of thermal expansion is 4.4 to $14 \times 10^{-6}$/k, and the coefficient of thermal conductivity is 70 W/mK to 200 W/mK. If only a ceramic powder is used, then the sintering temperature is too high, and it is impossible to construct the functionally gradient material because the temperature region for the densification for the ceramic part is greatly different from that for the metal part. Further, the thermal expansion in the temperature-raising process is also greatly different from that of the metal part. Therefore, the coefficient of thermal expansion, the sintering temperature region, and the densifying temperature region are adjusted to be approximately the same as those for the metal part.

Addition of 0.1% to 3% Alumina:

Alumina functions to densify aluminum nitride. If only the basic composition is used, then the degree of densification is up to about 90% or less, it is impossible to contemplate sufficient densification, and it becomes difficult to achieve the thermal conductivity of the required quality. Therefore, alumina is added in order to further facilitate the densification. If alumina is added in an amount of less than 0.1%, the effect is scarcely obtained. On the other hand, if alumina is added in an amount exceeding 3%, then no more effect is obtained, the coefficient of thermal conductivity is lowered as well, and the nitriding ratio of alumina is lowered.

Addition of 0.1% to 5% of Tungsten Carbide:

Tungsten carbide functions, for example, to add the shielding property to the sintered compact, decrease the densifying temperature without decreasing the coefficient of thermal conductivity, and increase the nitriding efficiency of aluminum. If tungsten carbide is added in an amount of less than 0.1%, no effect is obtained. On the other hand, if it is added in an amount exceeding 5%, the insulation performance as the ceramic is apparently affected thereby.

Addition of 0.1% to 3% of Calcium Oxide:

Calcium oxide functions to cause densification without decreasing the coefficient of thermal conductivity of aluminum nitride. If calcium oxide is added in an amount of less than 0.1%, no desired effect is obtained. On the other hand, if it is added in an amount exceeding 3%, then the nitriding ratio of aluminum is lowered, and it is impossible to obtain the insulation performance to satisfy the required quality.

Addition of 0.3% to 5% of Yttrium Oxide:

Yttrium oxide has an effect to densify the sintered compact in the same manner as calcium oxide, and it functions to achieve a high coefficient of thermal conductivity of aluminum nitride. If yttrium oxide is added in an amount of less than 0.3%, no effect is obtained. On the other hand, if it is added in an amount exceeding 5%, then the nitriding efficiency of aluminum is lowered without achieving the enhancement of the effect, and a trouble occasionally occurs in the insulation property.

Addition of 0.2% to 3% of Zirconium:

Zirconium functions to form an intermetallic compound together with metallic aluminum, prevent aluminum from being in a molten state or evaporation, and raise the temperature to be sufficiently high. The melting point of aluminum is about 660° C. or less, while the nitriding start temperature is not less than 1000° C. Therefore, the liquid phase formation is caused, and the contact area with the gas as a nitriding source is decreased, and the reaction efficiency is greatly lowered. Accordingly, it is necessary to exclude such inconveniences by the addition of zirconium.

Zirconium also functions to deliver nitrogen to aluminum during the nitriding process so as to improve the nitriding efficiency. Further, zirconium also has an effect to improve the brittleness of the obtained sintered compact. If the zirconium is added in an amount of less than 0.2%, then the effect is not obtained, and there is a possibility to inversely lower the coefficient of thermal conductivity. On the other hand, if it is added in an amount exceeding 3%, then the effect is not improved, and the decrease in coefficient of thermal conductivity is caused as well.

Addition of 0.1% to 1% of Chromium:

Chromium functions to improve the nitriding efficiency and stabilize aluminum exceeding the melting point. Chromium also functions to deliver nitrogen in the same manner as zirconium. If chromium is added in an amount of less than 0.1%, the effect is insufficient. On the other hand, if it is added in an amount exceeding 1%, the coefficient of thermal conductivity is greatly lowered.

Addition of 0.3% to 2% of Tungsten:

Tungsten functions in the same manner as zirconium and chromium. In the case of tungsten nitride, the coefficient of thermal conductivity is greatly lowered. Therefore, it is desirable to add tungsten in an amount of not more than 0.2%. If it is added in an amount of less than 0.3%, the effect is not obtained. The elements as described above also contribute to mutual diffusion with respect to the elements of the metal part.

Addition of 0.05% to 0.5% of Silver:

Silver functions to facilitate volume diffusion and prevent the compact from collapse before or after the nitriding process and from occurrence of deficiency in the compact. It is necessary for aluminum before the nitriding to convert it into an intermetallic compound before the arrival at the melting point. The reaction, for example, with tungsten, zirconium, and chromium is facilitated depending on the amount of addition of silver. If silver is added in an amount of less than 0.05%, the effect is not obtained. On the other hand, if it is added in an amount exceeding 0.5%, the nitriding does not proceed sufficiently. Further, silver causes mutual diffusion with respect to the metal part, and it is effective to give a gradient at the joining section so that the thickness of the diffusion layer is increased.

Addition of 0.1% to 1% of Copper:

Copper behaves and functions similarly to silver. However, if copper is added in a large amount, it is impossible to ensure the insulation performance. Therefore, the amount of addition is set to be not more than 1%. If silver is added in an amount of less than 0.1%, the desired effect is not obtained.

Other Additive Element:

Carbon functions to enhance the nitriding efficiency. On the other hand, carbon is added in order to greatly expand aluminum. Carbon is preferably added in an amount of not more than 1%. If carbon is added in an amount exceeding 5%, it is impossible to provide the desired function as the functionally gradient material.

Next, the metal part component and the ceramic part component, which have the compositions as described above respectively, are simultaneously molded in accordance with the isostatic pressing molding method to obtain a compact. The compact is dried, and then it is subjected to a sintering treatment in a nitrogen atmosphere to obtain a sintered compact. The sintering process and the nitriding process are performed in a temperature range of 1450 to 1600° C. Accordingly, the functionally gradient material is obtained, which is continuous from the metal part to the ceramic part, i.e., which includes no joining section. The functionally gradient material has an average coefficient of thermal conductivity of not less than 150 W/mK, wherein the ceramic part has a coefficient of thermal expansion of 4.8 to $5.7 \times 10^{-6}$/k, and the metal part has a coefficient of thermal expansion of 6.2 to $8.2 \times 10^{-6}$/k.

In the method for producing the functionally gradient material according to the present invention, the ceramic part composition and the metal part composition are prepared and adjusted such that the coefficient of thermal expansion of the ceramic composition portion is substantially the same as the coefficient of thermal expansion of the metal composition portion, and then the simultaneous sintering treatment is applied in a state in which the ceramic part material and the metal part material set as described above are laminated with each other. Accordingly, it is possible to reliably avoid, during the sintering treatment, for example, occurrence of cracks, deformation, and peeling at the lamination portion between the ceramic part material and the metal part material, which would be otherwise caused due to the difference in coefficient of thermal expansion.

In the present invention, the coefficient of thermal expansion of the ceramic composition portion is set to be substantially the same as that of the metal composition portion during the sintering treatment, i.e., at the temperature of production. Further, the former is set to be the same as the latter at the temperature of use as well. Accordingly, it is possible to effectively avoid, for example, peeling at the lamination portion during the use as well as during the sintering.

The coefficient of thermal expansion of the metal composition portion and the coefficient of thermal expansion of the ceramic composition portion can be changed by selecting the respective compositions. That is, Table 1 shows the change of the coefficient of thermal expansion obtained when the composition ratio is changed based on the use of combinations of tungsten and copper (W—Cu) and molybdenum and copper (Mo—Cu) as the metal part composition respectively.

TABLE 1

| Metal part Composition | Coefficient of thermal expansion × $10^{-6}$/k |
|---|---|
| 75 W  - 25 Cu | 9.6 |
| 80 W  - 20 Cu | 8.3 |
| 85 W  - 15 Cu | 7.2 |
| 90 W  - 10 Cu | 6.3 |
| 80 Mo - 20 Cu | 8.0 |
| 85 Mo - 15 Cu | 7.0 |
| 90 Mo - 10 Cu | 6.5 |

On the other hand, as shown in Table 2, the coefficient of thermal expansion of the ceramic composition portion can be changed by changing the composition ratio of the metallic aluminum, aluminum nitride, and other additives as the ceramic part composition respectively.

TABLE 2

| Ceramic part composition | Coefficient of thermal expansion × $10^{-6}$/k |
|---|---|
| AlN | 4.4 |
| 10 Al - 85 AlN - 5 (others) | 7.4 |
| 5 Al - 92 AlN - 3 (others) | 6.5 |
| 15 Al - 80 AlN - 5 (others) | 9.4 |
| 20 Al - 72 AlN - 8 (others) | 12.8 |

Accordingly, when the metal part composition and the ceramic part composition are selected so that (coefficient of thermal expansion of ceramic composition portion)/(coefficient of thermal expansion of metal composition portion)×100=75 to 125 (%), it is possible to avoid peeling at the lamination portion, which would be otherwise caused by the difference in coefficient of thermal expansion.

The sintering temperature region for the metal is different from that for the ceramic. For example, as for the sintering temperature, a difference in temperature of 750° C. to 1100° C. exists between copper as the metal and aluminum nitride as the ceramic. Accordingly, the densifying temperature for the ceramic is lowered by means of the reaction sintering. Concerning this process, Table 3 shows respective sintering temperature regions for the metal part composition and the ceramic part composition. The respective compositions are selected so that the sintering temperature region for the metal part composition is the same as that for the ceramic part composition.

TABLE 3

| Composition | Sintering temperature region (° C.) |
|---|---|
| Cu | 950–1070 |
| AlN | 1700–2200 |
| 80 W - 20 Cu | 1050–1450 |
| 90 W - 10 Cu | 1050–1550 |
| 10 Al - 85 AlN - 5 (others) | 1300–1600 |
| 15 Al - 80 AlN - 5 (others) | 1000–1500 |

As shown in Table 4, the composition to lower the nitriding temperature is set in order to effectively densify the reaction-sintered ceramic.

TABLE 4

| Composition | Nitriding temperature region (° C.) |
|---|---|
| Al | not less than 1580° C. |
| W | not less than 1580° C. |
| Zr | not less than 1580° C. |
| Cr | not less than 1580° C. |
| 10 Al - 85 AlN - 5 (others) | 1200–1600 |
| 15 Al - 80 AlN - 5 (others) | 1200–1600 |

Next, the ceramic part material and the metal part material set as described above are laminated, to which the simultaneous sintering treatment is applied. Accordingly, at the lamination portion, diffusion occurs from the metal layer to the ceramic layer, and diffusion occurs from the ceramic layer to the metal layer. Thus, the ceramic and the metal are subjected to mutual diffusion, and they are integrated into one unit.

The treatment involves the reaction nitriding, and hence the unreacted portion makes diffusion into the inside, and it is necessary to use multiple layers. Therefore, it is sufficient to only laminate the ceramic part material and the metal part material in two layers, making it possible to inexpensively produce the product by means of the simple molding step. Accordingly, the effect is obtained in that the thermal conductivity, the heat resistance and the stress resistance are excellent, and the joining reliability is improved.

In the method for producing the functionally gradient material according to the present invention, the composition of the metal part and the composition of the ceramic part are constructed so that they are similar to one another up to the densifying stage of the sintering process, while the metal part composition and the ceramic part composition are prepared so that each of them is converted into the metal and the ceramic substantially completely. That is, the metal is added to the ceramic part, while the ceramic is added to the metal part to allow each of them to form a composite material so that, for example, the contraction zone involved in thermal expansion and sintering is equivalent up to the sintering stage for the metal part composition and the ceramic part composition.

When the functionally gradient material is used as a semiconductor circuit substrate, a copper-molybdenum alloy having high thermal conductivity preferable for the insulating substrate for the heat sink is used as the metal part composition, while aluminum nitride is adopted as the ceramic part composition.

Especially, in order to carry the semiconductor and construct the circuit, aluminum nitride is required to be dense, having high insulation performance and high coefficient of thermal conductivity, with low thermal expansion. Therefore, the metal to be added to the ceramic part composition should be those which have low dielectric performance and should not be those which inhibit the densification of the ceramic. Further, the thermal conductivity of the ceramic part is greatly affected, for example, by impurities and the degree of densification. Accordingly, it is also necessary to consider this point.

From the viewpoint described above, the ceramic part material, which satisfies the function required for the heat sink, is set to have a composition comprising 70% to 90% of aluminum nitride (AlN), 5% to 25% of aluminum (Al), not more than 3% of zirconium (Zr), not more than 2% of chromium, not more than 3% of tungsten carbide (WC), not more than 2% of molybdenum, and not more than 1% of carbon (C).

Further, yttrium oxide, aluminum oxide, alkaline earth metal oxide, and oxide of lanthanum series element may be added within a range of not more than 5%. The addition of these elements makes it possible to lower the densifying temperature region and reduce the amount of ceramic to be contained in the metal a little.

Explanation will be made below for the respective compositions to be added as ceramic part materials.

Addition of Aluminum Nitride:

If aluminum nitride is added in an amount of less than 70%, the coefficient of thermal conductivity of the physical properties of the ceramic part of the functionally gradient material to be obtained is not more than 130 W/mK which is low, and hence such an amount of addition is not preferred from a viewpoint of the physical property. On the other hand, if aluminum nitride is added in an amount exceeding 90%, then the contraction zone and the thermal expansion of the ceramic part are different from those of the metal part, and it is impossible to construct the functionally gradient material.

Addition of Aluminum:

Addition of aluminum makes it possible to increase the thermal expansion of the ceramic part and lower the melting point of the ceramic part. Further, aluminum is added in order to make direct binding to aluminum nitride particles by means of the nitriding after the sintering or by means of the nitriding during the sintering stage.

If aluminum is added in an amount of less than 5%, the ceramic part is not densified even when the sintering temperature is raised to be not less than 2000° C. On the other hand, if it is added in an amount exceeding 25%, then the melting point of the ceramic part becomes too low, and the nitriding is not achieved by 100%. In such a situation, aluminum remains, and the thermal expansion becomes too large, making it impossible to construct the functionally gradient material.

Addition of Zirconium and Chromium:

These elements are not essential additive components. However, when zirconium and chromium are added in amounts of not more than 3% and not more than 2% respectively, then the efficiency of ceramic formation of the metals other than these metals added to the ceramic part is improved, and ceramic formation is achieved by 100%. If these elements are added in amounts of ranges exceeding 3% and 2% respectively, the coefficient of thermal conductivity of an obtained functionally gradient material is lowered, which is not preferred.

Addition of Tungsten Carbide and Molybdenum:

Tungsten carbide and molybdenum function as densifying agents for aluminum nitride without greatly lowering the coefficient of thermal conductivity of the ceramic part. However, since a large amount of molybdenum is contained in the composition of the metal part, these elements principally contribute to stabilization of the functionally gradient layer. If these elements are added in amounts exceeding 3% and 2% respectively, then other additive components, especially aluminum are affected thereby, and the ceramic formation and the densification are inhibited, which is not preferred.

Addition of Carbon:

Carbon functions to facilitate ceramic formation of the added metal. However, if carbon is added in an amount exceeding 1%, the densification is in a degree of 98%. Therefore, the amount of addition of carbon is set to be not more than 1%.

The addition of the metal oxide is effective to lower the sintering temperature for the ceramic part. However, when the metal oxide is added, then the nitriding of added aluminum is inhibited, and the thermal conductivity is greatly decreased in proportion to the amount of addition. Accordingly, it is desirable that the metal oxide is added in an amount of not more than 5%.

In order to provide the function as the heat sink, the composition of the metal part lies in a copper-molybdenum alloy. The metal part material is set to have a composition comprising 15% to 75% of molybdenum, 3% to 20% of copper (Cu), 2% to 10% of aluminum, 3% to 30% of aluminum nitride, not more than 0.3% of magnesium (Mg), 0.5% to 5% of cobalt (Co), not more than 5% of nickel (Ni), 5% to 30% of molybdenum carbide ($Mo_2C$), not more than 0.3% of silver (Ag), and 0.1% to 5% of carbon.

Explanation will be made below for the respective compositions to be added as metal part materials.

Addition of Molybdenum:

As for the copper-molybdenum alloy, if the coefficient of thermal expansion is too large as compared with the ceramic layer, peeling and deformation occur at the interface between the copper-molybdenum alloy and the ceramic layer during the densification effected by sintering. In such a situation, it is impossible to construct the functionally gradient material. Accordingly, the range of addition of molybdenum is set to be 15% to 75%.

Addition of Copper:

Copper has a function like a binding material to densify molybdenum, and it is an essential component in order to ensure the thermal conductivity as a necessary characteristic. If copper is added in an amount of less than 3%, then the effect is not obtained, and it is necessary to add another component in place of copper. However, if such a component is added, the thermal conductivity is decreased, which is not preferred. If copper is added in a range exceeding 20%, then the thermal expansion is too large, and it is impossible to construct the functionally gradient material.

Addition of Aluminum:

Aluminum is required to construct the functionally gradient layer and mitigate, for example, the difference in physical property between the metal part and the ceramic part while making strong binding to the ceramic part. If aluminum is added in an amount less than 2%, then the binding between the ceramic part and the metal part, which is the function of the functionally gradient layer, is insufficient, the functionally gradient layer tends to be porous, and it is impossible to exhibit any sufficient function. On the other hand, if aluminum is added in an amount exceeding 10%, the thermal expansion of the metal part becomes too large, and the melting point is greatly lowered. As a result, the deformation is large during the sintering, and it is impossible to obtain the functionally gradient material.

Addition of Aluminum Nitride:

Aluminum nitride is required to raise the melting point of the metal part so that the functionally gradient layer is constructed. If aluminum nitride is added in an amount of less than 3%, then the amount is too small from a viewpoint of construction of the functionally gradient layer, a viewpoint of increase of the melting point of the metal part, and a viewpoint of decrease of the thermal expansion. On the other hand, if aluminum nitride is added in an amount exceeding 30%, the densification of the metal part does not occur.

Addition of Magnesium:

Magnesium functions to improve the state in which added aluminum nitride is not bound to the metal due to low affinity, so that the ceramic component and the metal are bound to one another. If magnesium is added in an amount exceeding 0.3%, then the melting point tends to lower, and the effect of magnesium is saturated, which is not preferred.

Addition of Cobalt:

Cobalt functions as a binding material for added molybdenum carbide, and it has an effect to facilitate the densification. If cobalt is added in an amount of less than 0.5%, the effect disappears. If it is added in an amount exceeding 5%, then the effect of densification is saturated, and the coefficient of thermal conductivity is lowered as well.

Addition of Nickel:

Nickel facilitates grain growth of molybdenum carbide or the like as added ceramic particles, and it contributes to the improvement in densification. The amount of addition of nickel greatly affects the coefficient of thermal conductivity, and nickel has high dielectric performance. Therefore, it is also feared that the nickel may also affect the ceramic layer. Therefore, it is desirable that the amount of addition of nickel is set to be not more than 0.5%.

Addition of Molybdenum Carbide:

Molybdenum carbide functions in the same manner as aluminum nitride such that the melting point of the metal part is raised without decreasing the coefficient of thermal conductivity, the coefficient of thermal expansion is decreased, and the sintering zone is allowed to be identical with respect to the ceramic part. If molybdenum carbide is added in an amount of less than 5%, the effect is not obtained. On the other hand, if it is added in an amount exceeding 30%, then the effect is merely saturated, it becomes difficult to perform the densification, the conversion into metal does not proceed, and the coefficient of thermal conductivity of an obtained functionally gradient material is lowered.

Addition of Silver:

Silver functions such that the wettability between the added ceramic and the metal is improved, the volume diffusion of the metal is facilitated, and the densification is promoted. If silver is added in an amount exceeding 0.3%, then the metal part has a low melting point, and hence the simultaneous densification is not achieved, which would be otherwise achieved while forming the functionally gradient layer together with the ceramic part.

Addition of Carbon:

Carbon is required to convert the added ceramic into metal. If carbon is added in an amount of less than 0.1%, the effect cannot be obtained. If it is added in an amount exceeding 5%, the metal is inversely made into ceramic, which is inconvenient.

Hydride is added to the material powder of the ceramic part and/or the material powder of the metal part. The hydride functions like a catalyst to improve the efficiency upon ceramic formation from the metal added to the ceramic part and upon metallization from the ceramic added to the metal part. If the hydride is added in an amount of less than 0.1%, no apparent effect is obtained. On the other hand, even if it is added in an amount exceeding 5%, the effect is not changed. Considering the safety operation, the handling convenience, and the factor of cost, it is unsuitable to add the hydride in an amount of not less than 5%.

The material powder of the metal part and the material powder of the ceramic part, which are optionally added with the hydride powder, are subjected to wet blending by using, for example, an organic solvent. After that, the obtained powder is molded in accordance with an ordinary method in the powder metallurgy, for example, the pressure molding method, the injection molding method, or the sheet molding method based on the use of a slurry.

In the pressure molding method, only a predetermined amount of the powder of the metal part or the ceramic part is placed in a mold to perform preforming, and then the powder of the ceramic part or the metal part is introduced into the mold to perform molding by applying a predetermined pressure. During this process, it is desirable to use the isostatic pressing molding method effected in the mold in which no binder is used, because the degreasing temperature of the usually added binder is approximate to the melting point of added aluminum.

In the case of the injection molding method, the molding process may be performed in the same manner as described above, in which one of the material powders is formed and placed in a mold and the other material powder is injected in this state so that molding is performed to make mutual overlay.

When the functionally gradient material having a thin thickness such as the semiconductor substrate is produced, it is possible to adopt the sheet molding method and the tape molding method in which molding is performed in a state in which the powder is dispersed in an organic solvent or the like. Also in the case of these molding methods, sheets are previously formed separately, and they are overlaid with each other to produce the functionally gradient material.

The compact, which has been molded into a predetermined shape in accordance with the molding method as described above, is densified by being introduced into a furnace to apply the sintering treatment thereto. The sintering treatment may be performed in a vacuum atmosphere or in a hydrogen atmosphere. However, considering the operability, a nitrogen atmosphere is preferably used.

The pressurizing force during the sintering resides in a reduced pressure of about 0.1 Pa to 10 Pa, in a temperature region in which evaporation of the added metal is not caused, or evaporation thereof is caused a little. At a temperature higher than the above, the pressure is set to be approximate to the atmospheric pressure or to be in a pressurized state higher than the atmospheric pressure, in order to avoid evaporation of the metal at a high temperature and cause complete ceramic formation for the ceramic part. At a pressure not higher than the atmospheric pressure, the degree of ceramic formation of the ceramic part does not arrive at 100% in some cases. Therefore, it is complicated to manage the condition therefor, which is not preferred.

The sintering temperature is within a range of 1430° C. to 1850° C. The sintering time is set to be not less than 15 minutes, and preferably not less than 30 minutes. If the sintering temperature is less than 1430° C., the densification is not more than 98%. Especially, the relative density closely relates to the coefficient of thermal conductivity and the insulation performance on the ceramic part. Therefore, such a sintering temperature is not preferred. On the other hand, if the sintering temperature exceeds 1850° C., then the metal such as copper is evaporated due to the high temperature, the inside of the furnace is contaminated, and the relative density is lowered as well.

The relative density exceeds 98% when the sintering temperature is within the temperature range of 1430° C. to 1850° C. When the sintering temperature is within a range of 1480° C. to 1780° C., then the relative density is 100%, and defective pores or the like are not observed even by means of observation with an electron microscope. If the sintering time is less than 15 minutes, then the densification does not proceed sufficiently, and the relative density is about 98% or less. Therefore, the sintering time of not less than 30 minutes is preferred, in which the relative density is 100%.

The functionally gradient material having been subjected to the sintering treatment is cooled, or the temperature is lowered immediately after the sintering, and the material is subjected to a heat treatment for not less than 30 minutes in a temperature range of 900° C. to 1400° C. Accordingly, the ceramic of the metal part is converted into metal, and the functionally gradient layer can be stabilized. The physical properties can be also improved by about 10%. If the treatment temperature is lower than 900° C., or if it is higher than 1400° C., it is difficult to efficiently convert the ceramic into metal. Therefore, the temperature is set to be within the temperature range described above.

In the method for producing the functionally gradient material according to the present invention, when the functionally gradient material is used as a semiconductor circuit substrate, a copper-tungsten alloy, which has high thermal conductivity preferable for the insulating substrate for the heat sink, is used for the composition of the metal part, while aluminum nitride is adopted for the composition of the ceramic part.

The ceramic part material, which satisfies the function required for the heat sink, is set to have a composition comprising 70% to 90% of aluminum nitride (AlN), 5% to 25% of aluminum (Al), not more than 3% of zirconium (Zr), not more than 2% of chromium (Cr), not more than 3% of tungsten carbide (WC), not more than 2% of tungsten (W), and not more than 1% of carbon (C).

Further, yttrium oxide, aluminum oxide, alkaline earth metal oxide, and oxide of lanthanum series element may be added within a range of not more than 5%. The addition of these elements makes it possible to lower the densifying temperature region and reduce the amount of ceramic to be contained in the metal a little.

Addition of Tungsten Carbide and Tungsten:

Tungsten carbide and tungsten function as densifying agents for aluminum nitride without greatly decreasing the coefficient of thermal conductivity of the ceramic part. However, since a large amount of tungsten is contained in the composition of the metal part, these elements principally contribute to stabilization of the functionally gradient layer. If these elements are added in amounts exceeding 3% and 2% respectively, then other additive components, especially aluminum are badly affected thereby, and the ceramic formation and the densification are inhibited, which is not preferred.

The metal part composition lies in a copper—tungsten alloy in order to provide the function as the heat sink. The metal part material is set to have a composition comprising 15% to 75% of tungsten, 3% to 20% of copper (Cu), 2% to 10% of aluminum, 3% to 30% of aluminum nitride, not more than 0.3% of magnesium (Mg), 0.5% to 5% of cobalt (Co), not more than 0.5% of nickel (Ni), 5% to 40% of tungsten carbide, not more than 0.3% of silver (Ag), and 0.1% to 5% of carbon.

Addition of Tungsten:

As for the copper—tungsten alloy, if the coefficient of thermal expansion is too large as compared with the ceramic layer, then peeling and deformation occur at the interface between the copper—tungsten alloy and the ceramic layer during the densification effected by sintering, and it is impossible to construct the functionally gradient material. Accordingly, the range of addition of tungsten is set to be 15% to 75%.

Addition of Copper:

Copper has a function like a binding material to densify tungsten, and it is an essential component in order to ensure the thermal conductivity as a necessary characteristic. If copper is added in an amount of less than 3%, then the effect is not obtained, and it is necessary to add another component in place of copper. However, if such a component is added, the thermal conductivity is decreased, which is not preferred. If copper is added in a range exceeding 20%, then the thermal expansion is too large, and it is impossible to construct the functionally gradient material.

Addition of Cobalt:

Cobalt functions as a binding material for added tungsten carbide, and it has an effect to facilitate the densification. If cobalt is added in an amount of less than 0.5%, the effect disappears. If it is added in an amount exceeding 5%, then the effect of densification is saturated, and the coefficient of thermal conductivity is lowered as well.

Addition of Nickel:

Nickel facilitates grain growth of tungsten carbide or the like as added ceramic particles, and it contributes to the improvement in densification. The amount of addition of nickel greatly affects the coefficient of thermal conductivity, and nickel has high dielectric performance. Therefore, it is also feared that the nickel may also affect the ceramic layer. Therefore, it is desirable that the amount of addition of nickel is set to be not more than 0.5%.

Addition of Tungsten Carbide:

Tungsten carbide functions in the same manner as aluminum nitride such that the melting point of the metal part is raised without decreasing the coefficient of thermal conductivity, the coefficient of thermal expansion is decreased, and the sintering zone is allowed to be identical with that for the ceramic part. If tungsten carbide is added in an amount of less than 5%, the effect is not obtained. On the other hand, if it is added in an amount exceeding 40%, then the effect is merely saturated, it becomes difficult to perform the densification, the conversion into metal does not proceed, and the coefficient of thermal conductivity of an obtained functionally gradient material is lowered.

The material powder of the metal part and the material powder of the ceramic part, which are optionally added with the hydride powder, are subjected to wet blending by using, for example, an organic solvent. After that, the obtained powder is molded in accordance with an ordinary method in the powder metallurgy, for example, the pressure molding method, the injection molding method, or the sheet molding method based on the use of a slurry.

In the pressure molding method, only a predetermined amount of the powder of the metal part or the ceramic part is placed in a mold to perform preforming, and then the powder of the ceramic part or the metal part is introduced into the mold to perform molding by applying a predetermined pressure. During this process, it is desirable to use the isostatic pressing molding method effected in the mold in which no binder is used, because the degreasing temperature of the usually added binder is approximate to the melting point of added aluminum.

In the case of the injection molding method, the molding process is performed in the same manner as described above, in which one of the material powders is formed and placed in a mold and the other material powder is injected in this state to perform molding to make mutual overlay.

When the functionally gradient material having a thin thickness such as the semiconductor substrate is produced, it is possible to adopt the sheet molding method and the tape molding method in which molding is performed in a state in which the powder is dispersed in an organic solvent or the like. Also in the case of these molding methods, sheets are previously formed separately, and they are overlaid with each other to produce the functionally gradient material.

The compact, which has been molded into a predetermined shape in accordance with the molding method as described above, is densified by being introduced into a furnace to apply the sintering treatment thereto. The sintering treatment may be performed in a vacuum atmosphere or in a hydrogen atmosphere. However, considering the operability, a nitrogen atmosphere is preferably used.

The pressurizing force during the sintering resides in a reduced pressure of about 0.1 Pa to 10 Pa, in a temperature region in which evaporation of the added metal is not caused, or evaporation thereof is caused a little. At a temperature higher than the above, the pressure is set to be approximate to the atmospheric pressure or to be in a pressurized state higher than the atmospheric pressure, in order to avoid evaporation of the metal at a high temperature and cause complete ceramic formation for the ceramic part. At a pressure not higher than the atmospheric pressure, the degree of ceramic formation of the ceramic part does not arrive at 100% in some cases. Therefore, it is complicated to manage the condition therefor, which is not preferred.

The sintering temperature is within a range of 1480° C. to 2000° C. The sintering time is set to be not less than 15 minutes, and preferably not less than 30 minutes. If the sintering temperature is less than 1480° C., the densification is not more than 98%. Especially, the relative density closely relates to the coefficient of thermal conductivity and the insulation performance on the ceramic part. Therefore, such a sintering temperature is not preferred. On the other hand, if the sintering temperature exceeds 2000° C., then the metal such as copper is evaporated due to the high temperature, the inside of the furnace is contaminated, and the relative density is lowered.

The relative density exceeds 90% when the sintering temperature is within the temperature range of 1480° C. to 2000° C. When the sintering temperature is within a range of 1540° C. to 1940° C., then the relative density is 100%, and defective pores or the like are not observed even by means of observation with an electron microscope. If the sintering time is less than 15 minutes, then the densification does not proceed sufficiently, and the relative density is about 98% or less. Therefore, the sintering time of not less than 30 minutes is preferred, in which the relative density is 100%.

The functionally gradient material having been subjected to the sintering treatment is cooled, or the temperature is lowered immediately after the sintering, and the material is subjected to a heat treatment for not less than 30 minutes in a temperature range of 900° C. to 1400° C. Accordingly, the ceramic in the metal part is converted into metal, and the functionally gradient layer can be stabilized. The physical properties can be also improved by about 10%. If the treatment temperature is lower than 900° C., or if it is higher than 1400° C., then the ceramic is not efficiently converted into metal. Therefore, the temperature range is set to be within the temperature range described above.

In the method for producing the functionally gradient material according to the present invention, a metal powder mixture obtained by adding a ceramic component to a metal part composition and a ceramic powder mixture obtained by adding a metal component to a ceramic part composition are prepared, and they are laminated to apply a sintering treatment thereto. Accordingly, it is possible to minimize the difference in coefficient of thermal conductivity, the difference in thermal expansion, and the differential temperature region of the contraction during the sintering. Further, the caused thermal reaction can be suppressed to the minimum, and it is possible to effectively avoid peeling and deformation such as warpage in the vicinity of the interface.

Moreover, the ceramic component added to the metal part composition is converted into metal, and the metal component added to the ceramic part composition is converted into ceramic during the sintering or upon completion of the sintering. Therefore, the mutual diffusion layer is formed in the vicinity of the interface between the two layers, and it is possible to obtain the functionally gradient material having a desired gradient composition.

The metal part composition, which forms the metal layer as one end surface of the functionally gradient material after the sintering, comprises the principal metal to be contained by not less than 50%, to which almost all practically usable alloys are applicable, including, for example, copper alloys, aluminum alloys, titanium alloys, tungsten alloys, nickel alloys, and cobalt alloys. The ceramic part composition, which forms the ceramic layer as the other end surface of the functionally gradient material, comprises the principal ceramic to be contained by not less than 50%, for which almost all representative ceramics are appropriate, including, for example, aluminum nitride, silicon nitride, silicon carbide, zirconium nitride, titanium nitride, titanium carbide, zirconium carbide, titanium boride, and zirconium boride.

The ceramic component is added to the metal part composition principally comprising the metal described above, and the metal component is added to the ceramic part composition principally comprising the ceramic described above. The metallization of the ceramic component added to the metal part composition and the ceramic formation of the metal component added to the ceramic part composition proceed in accordance with, for example, the temperature during the sintering, the partial pressure of the atmosphere gas, and the heat treatment after the sintering. The thickness of the diffusion layer is also set depending on the conditions as described above.

Those applicable to the ceramic component to be converted into metal during the sintering include any one of carbides, nitrides, carbonitrides, and oxides of elements of the group III including lanthanum series elements, elements of the group IV, elements of the group V, and elements of the group VI, and mixtures thereof. On the other hand, those applicable to the metal component to be converted into ceramic during the sintering include any one of elements of the group III including lanthanum series elements, elements of the group IV, elements of the group V, and elements of the group VI, and mixtures thereof.

The ceramic component and the metal component are subjected to mutual diffusion while making change during the sintering from the ceramic to the metal and from the metal to the ceramic. Thus, the functionally gradient material is produced. In the case of an actually obtained functionally gradient material, the added ceramic component was scarcely observed on the metal layer side, and the ceramic component was converted into metal, or it was subjected to rearrangement to the gradient layer. The added metal was also scarcely observed in the ceramic layer, and the metal component was converted into ceramic, or it underwent rearrangement to the gradient layer.

It is necessary that the mutual diffusion in the gradient layer occurs intensively as compared with the diffusion thickness brought about by the ordinary joining or the heat treatment. A compact is used, in which the metal powder mixture and the ceramic powder mixture are set to have predetermined thicknesses respectively, and they are laminated in two layers. Accordingly, even in the case of the minimum number of lamination (two layers), the thermal stress generated during the densifying process can be minimized. It is possible to easily and reliably produce the functionally gradient material which has the gradient layer containing the metal and the ceramic subjected to mutual diffusion and which has the metal layer and the ceramic layer on its both end surfaces. It is unnecessary to use any special apparatus such as hot press and HIP (hot isostatic press). The functionally gradient material of the present invention can be produced by means of the sintering process at an ordinary pressure or at a pressurized pressure. Accordingly, it is possible to improve the productivity.

The atmosphere, which is required to perform ceramic formation for the metal component and metallization of the ceramic component, is nitrogen, atmospheric air, or carbon. As for carbon, it is allowable to use, for example, CO. However, it is also allowable to apply the sintering treatment by embedding the sintering object in carbon powder. The pressure required for such a process may be generally in a range from a reduced pressure to several atmospheres.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
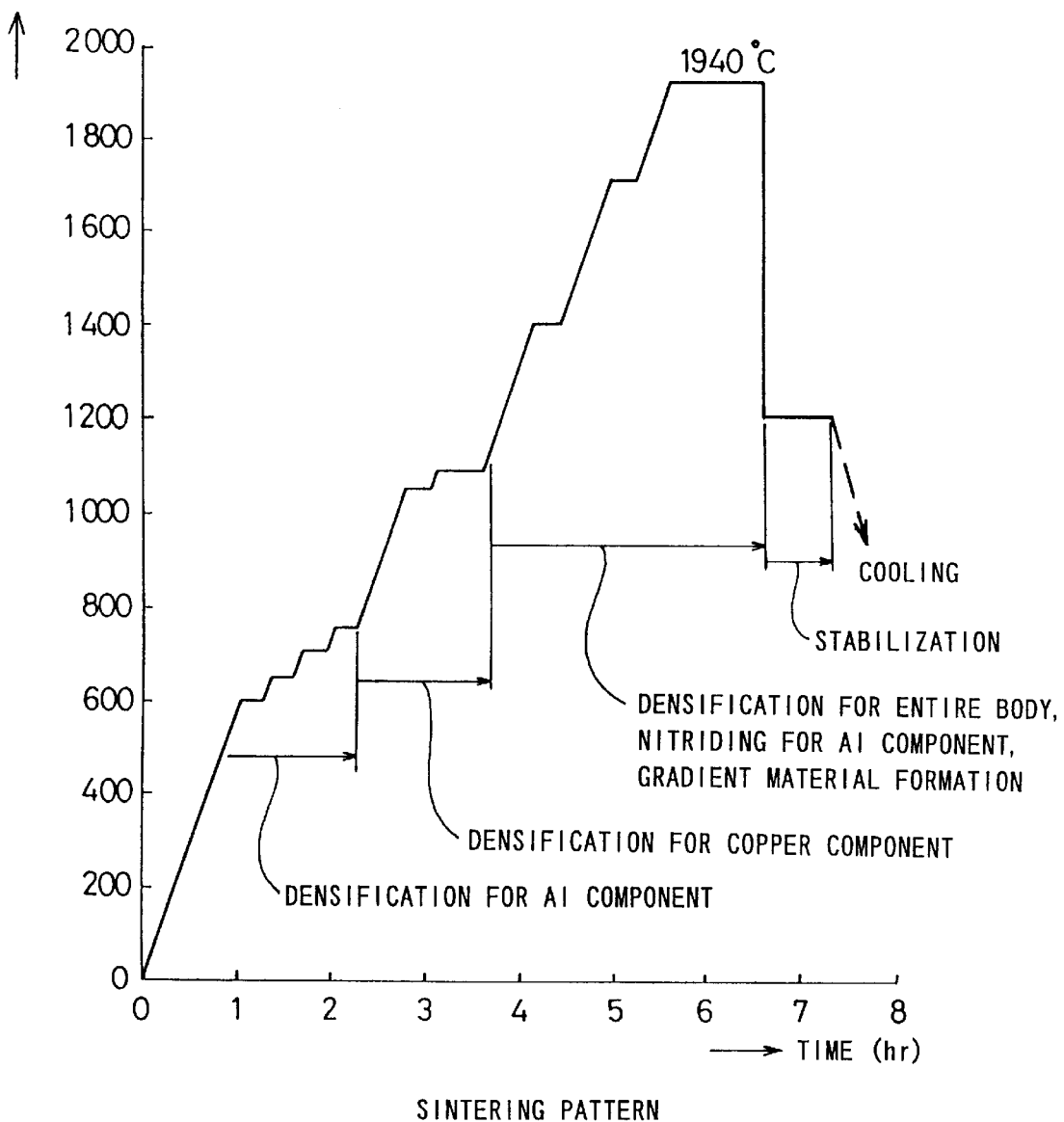
FIG. 1 illustrates a sintering pattern employed in a method for producing a functionally gradient material according to a third embodiment of the present invention.

A functionally gradient material according to a first embodiment of the present invention will be explained below.

At first, metal part powders set to have blending compositions shown by Nos. 1 to 7 in Table 5 were prepared as metal part compositions. On the other hand, ceramic powders having blending compositions shown by Nos. a to g in Table 6 were prepared as ceramic part compositions. These powders were mixed with each other sufficiently homogeneously by means of wet blending.

TABLE 5

Blending composition in experiment (metal part)

| | Composition | | | | | |
|---|---|---|---|---|---|---|
| No. | W | Cu | Al | Ag | Group VIII | Others |
| 1 | 88.5 | 11.5 | | | | |
| 2 | 88.5 | 11.2 | 0.3 | | | |
| 3 | 88.5 | 10.7 | 0.3 | 0.5 | | |
| 4 | 88.0 | 9.6 | 0.4 | 0.5 | 1.5 | |
| 5 | 87.3 | 10.5 | 0.3 | 0.4 | 1.3 | 0.2 |
| 6 | 84.0 | 14.7 | 0.3 | 0.4 | 0.6 | |
| 7 | 73.0 | 24.0 | 1 | 0.3 | 1.7 | |

TABLE 6

Blending composition in experiment (ceramic part)

| | Composition | | | | | | | |
|---|---|---|---|---|---|---|---|---|
| No. | Al | AlN | Zr | Cr | WC | Ag | Cu | Al$_2$O$_2$ and Others |
| a | 15 | 85 | | | | | | |
| b | 14 | 85 | 1 | | | | | |
| c | 12.5 | 85 | 1 | 0.5 | 1 | | | |
| d | 12.3 | 85 | 1 | 0.5 | 1 | 0.2 | | |
| e | 11 | 85 | 1 | 0.4 | 1 | 0.2 | 0.3 | 1 |
| f | 15 | 80 | 1 | 0.5 | 1.3 | 0.2 | 0.3 | 1 CaO |
| g | 5 | 92 | 0.5 | 0.2 | 1 | 0.1 | 0.3 | 1 |

Next, the metal part compositions of Nos. 1 to 7 were combined with the ceramic part compositions of Nos. a to g. They were molded in accordance with the isostatic pressing molding method based on the use of alcohol to obtain compacts. During this process, paper sheets were disposed between punches to perform molding under a molding condition of 120 MPa. The compact had a thickness of 6 mm on the metal part and a thickness of 3 mm on the ceramic part.

The respective compacts were heated up to 650° C. while allowing nitrogen gas to flow at 5 torr, and they were retained at this temperature for 15 minutes. After that, the paper sheets and alcohol were removed. Next, the compacts were retained under the same condition at 1070° C., 1100° C., 1180° C., 1350° C., 1400° C., and 1450° C. for 30 minutes, 15 minutes, 15 minutes, 30 minutes, 15 minutes, and 10 minutes respectively. The pressure of nitrogen was pressurized up to 1.5 bar at 1450° C. to obtain nitrided sintered compacts.

The density and the average coefficient of thermal conductivity in cross section were measured for these sintered compacts. Results are shown in Table 7. In Table 7, the following symbols are used. That is, those having a density of not less than 98% and an average coefficient of thermal conductivity in the sectional direction of the sintered compact of not less than 150 W/mK are indicated by "++". Those having a density of 95 to 98% or less and an average coefficient of thermal conductivity in the sectional direction of 100 W/mK to 150 W/mK or less are indicated by "+". Those other than the above, which are not competent for the test or the practical use, are indicated by

TABLE 7

Result matrix for test pieces after sintering

| Ceramic part | Metal part | | | | | | |
|---|---|---|---|---|---|---|---|
| | 1 | 2 | 3 | 4 | 5 | 6 | 7 |
| a | − | − | − | − | − | − | − |
| b | − | + | + | + | ++ | + | + |
| c | − | + | + | + | ++ | + | + |
| d | − | + | + | ++ | ++ | + | + |
| e | + | + | ++ | ++ | ++ | ++ | + |
| f | + | + | ++ | ++ | ++ | ++ | + |
| g | + | + | + | ++ | ++ | ++ | + |

A method for producing a functionally gradient material according to a second embodiment of the present invention will be explained below.

In the second embodiment, explanation will be made for the steps of producing the functionally gradient material obtained by integrating a heat sink base and a ceramic substrate as a heat-radiating substrate. In general, such a method comprises a step of producing a substrate, a step of processing the substrate, a step of directly arranging copper on a matching surface of the substrate, a step of applying nickel plating to the arrangement section, a step of producing a heat sink base, a step of processing the heat sink base, and a step of performing soldering with solder interposed between the substrate and the heat sink base. However, in the second embodiment, these steps are condensed, and the method is carried out in two steps of producing the functionally gradient material and processing the same. The processing step is performed to make the plane roughness of the ceramic substrate side to be not less than 0.8S, which can be carried out in one step, for example, by means of shot blast.

Aluminum nitride was selected as the ceramic part composition in view of the thermal conductivity and the coefficient of thermal expansion. On the other hand, copper—tungsten(—Ag) was selected from the copper alloys, as the metal part composition disposed in the heat sink base side in view of the thermal conductivity and the coefficient of thermal expansion.

Ceramic part materials and metal part materials having composition ratios shown in Tables 8 and 9 were set considering that the coefficient of thermal expansion of the ceramic part composition would be approximately the same as that of the metal part composition at the producing temperature and the using temperature, and the sintering temperature region for the ceramic part would be the same as that for the metal part.

TABLE 8

Composition ratio of ceramic part

| No. | Composition | | | | | | | |
|---|---|---|---|---|---|---|---|---|
| | Al | AlN | Zr | Cr | WC | Ag | Cu | Al$_2$O$_3$ |
| 11 | 11 | 85 | 1 | 0.5 | 1 | 0.2 | 0.3 | 1 |
| 12 | 5 | 92 | 0.5 | 0.2 | 1 | 0.1 | 0.2 | 1 CaO |
| 13 | 15 | 80 | 1 | 0.5 | 1 | 0.2 | 0.3 | 1 |
| 14 | 20 | 72 | 1 | 0.7 | 1.3 | 0.2 | 0.3 | 1 + 1 CaO |

TABLE 9

Composition ratio of metal part

| No. | Composition | | | | |
|---|---|---|---|---|---|
| | Cu | W | Al | Ag | Co(Ni) |
| a1 | 24 | 73 | 1 | 0.3 | 1.7 |
| b1 | 19.5 | 79 | 0.5 | 0.3 | 0.7 |
| c1 | 14.7 | 84 | 0.3 | 0.4 | 0.6 |
| d1 | 9.7 | 88.5 | 0.3 | 0.5 | 1.5 |

Next, the compositions of Nos. 11 to 14 shown in Table 8 were combined with the compositions of Nos. a1 to d1 shown in Table 9. The ratio between the coefficients of thermal expansion in the sintering temperature region, i.e. (coefficient of thermal expansion of ceramic)/(coefficient of thermal expansion of metal)×100 (%) was calculated. Results are shown in Table 10.

TABLE 10

Matrix of tested thermal expansion coefficient ratio (%)

| Metal part | Ceramic part | | | |
|---|---|---|---|---|
| | 11 | 12 | 13 | 14 |
| a1 | 129.7 | 112.2 | 97.3 | 85.1 |
| b1 | 147.7 | 127.7 | 110.8 | 96.9 |
| c1 | 102.1 | 88.3 | 76.6 | 67.0 |
| d1 | 75.0 | 64.8 | 56.3 | 49.2 |

The ceramic part materials and the metal part materials were subjected to wet blending by using an organic solvent respectively. After that, the organic solvent was adjusted to be 13 vol %, and molding was performed by means of the isostatic pressing molding method to obtain compacts. During this process, a paper sheet was placed on the lower punch of the mold, on which the metal part powder was charged to perform contraction at about 20 MPa. Subsequently, the ceramic part material powder was charged, on which a paper sheet was placed to perform molding at a pressure of 120 MPa. The paper sheet functions to avoid leakage of the organic solvent from the compact during the pressurizing process and exclude adhesion between the mold punch and the compact so that the molding yield is maintained.

Next, the respective compacts were dried, and then they were heated to 1350° C. at 0.5 Torr or less under the flow of nitrogen gas. They were subjected to nitriding sintering at 1450° C. for 90 minutes at 1 bar of nitrogen gas. The presence or absence of any defect was inspected for the respective sintered compacts obtained under the sintering condition described above. Results are shown in Table 11.

TABLE 11

Matrix table illustrating state of functionally gradient material after sintering

| Metal part | Ceramic part | | | |
|---|---|---|---|---|
| | 11 | 12 | 13 | 14 |
| a1 | ± | + | ++ | ++ |
| b1 | − | + | ++ | ++ |
| c1 | ++ | ++ | + | − |
| d1 | + | − | − | − |

In Table 11, the following symbols are used. That is, those which can be practically used owing to sufficient achievement of densification judging, for example, from the density and observation for the cross section are indicated by "++". Those in which no occurrence of defect or the like is observed and which can be experimentally used are indicated by "+". Those in which occurrence of crack or the like is observed but which retain the shape are indicated by "±". Those which involve many defects such as breakage and cracks and which are difficult to be handled are indicated by "−". Although the test was performed for them while changing the sintering condition and the pattern, those evaluated by "±" and "−" were not improved into those evaluated by "++" and "+". The test was performed while changing the sintering condition in a range of 1000° C. to 1700° C.

Accordingly, the functionally gradient material was successfully produced without causing any observable or visible level defect when the thermal expansion coefficient ratio in the vicinity of the using temperature was 75 to 125 (%). When the thermal expansion coefficient ratio was 85 to 115 (%), the excellent functionally gradient material having the desired function was constructed.

The functionally gradient material, which was produced by combining No. 11 and No. c1, exhibited a high value of average coefficient of thermal conductivity of 180 W/mK. Therefore, remarkable improvement was realized as compared with the heat sink base-integrated type semiconductor substrate having been hitherto produced by means of soldering, having a coefficient of thermal conductivity up to 100 W/mK.

In relation to a method for producing a functionally gradient material according to a third embodiment of the present invention, explanation will be made for a method for present invention, explanation will be made for a method for producing a heat sink-integrated type insulating substrate for constructing the semiconductor circuit substrate.

At first, material powder compositions of the metal part are shown in Table 12, and material powder compositions of the ceramic part are shown in Table 13.

TABLE 12

Material powder composition of metal part (%)

| | Mo | Cu | Al | AlN | Mg | Co | Ni | Mo$_2$C | Ag | TiH$_4$ | C |
|---|---|---|---|---|---|---|---|---|---|---|---|
| A | 20 | 3 | 7 | 35 | 0.2 | 2 | 0.1 | 29.6 | 0.1 | 2 | 1 |
| B | 30 | 5 | 5 | 30 | 0.2 | 2 | 0.3 | 24.4 | 0.1 | 2 | 1 |
| C | 45 | 7 | 3 | 20 | 0.2 | 1 | 0.2 | 19.5 | 0.1 | 3 | 1 |

TABLE 13

Material powder composition of ceramic part (%)

| | AlN | Al | Zr | Cr | WC | Mo | Ag | TiH$_4$ | LaH$_3$ |
|---|---|---|---|---|---|---|---|---|---|
| 21 | 77 | 18 | 1 | 1 | 1 | | 0.1 | 0.5 | 0.5 |
| 22 | 83.5 | 12 | 1 | 0.5 | 1 | 1 | | 0.5 | 0.2 |

In the third embodiment, the metal part layer and the ceramic part layer were constructed by single layers respectively to perform an experiment for producing the functionally gradient material by using the two-layered laminated compact.

On the other hand, an accumulated compact having a multiple layered structure obtained by gradually changing the components as having been hitherto performed was used as an illustrative comparative sample. A blending composition shown in Table 14 was used therefor.

TABLE 14

Powder composition based on ordinary method for forming gradient material (illustrative comparative sample) (%)

| | AlN | CaO | Y$_2$O$_3$ | Cu | W |
|---|---|---|---|---|---|
| a2 | 97 | 1 | 2 | | |
| b2 | 87.3 | 0.9 | 1.8 | 1.5 | 8.5 |
| c2 | 77.6 | 0.8 | 1.6 | 3.0 | 17.0 |
| d2 | 67.9 | 0.7 | 1.4 | 4.5 | 25.5 |
| e2 | 58.2 | 0.6 | 1.2 | 6.0 | 34.0 |
| f2 | 48.5 | 0.5 | 1.0 | 7.5 | 42.5 |
| g2 | 38.8 | 0.4 | 0.8 | 9.0 | 51.0 |
| h2 | 29.1 | 0.3 | 0.6 | 10.5 | 59.5 |
| i2 | 19.4 | 0.2 | 0.4 | 12.0 | 68.0 |
| j2 | 9.7 | 0.1 | 0.2 | 13.5 | 76.5 |
| k2 | 0 | 0 | 0 | 15 | 85 |

Accordingly, all of the powder compositions shown in Tables 12 to 14 were subjected to wet blending, and then respective combinations shown in Table 15 except for the illustrative comparative sample were used to perform molding at a pressure of 120 MPa by means of the isostatic pressing molding method, in which the ceramic part had a forming thickness of 2.5 mm, and the metal part had a forming thickness of 4 mm. In the illustrative comparative sample, the eleven layers were laminated while changing the composition by 10% for each of the layers. As for the ceramic part and the metal part, the layer "a" and the layer "k" in Table 14 had a thickness of 1 mm respectively. The other layers had a thickness of 0.5 mm. Molding was performed by means of the isostatic pressing molding method. The entire compact had a thickness of 6.5 mm.

It is noted that the isostatic pressing molding method is a method in which the uniformity of the molding pressure is excellent, and few defect occurs at the inside of the compact. In the case of the compacts according to the third embodiment, a yield of about 100% was obtained. On the contrary, in the case of the illustrative comparative sample composed of the eleven layers of the laminated compact, the peeling tended to occur at the boundary portion, and the yield had a low value of about 30%.

Next, the compacts were subjected to a drying treatment at 50° C. for about 8 hours, and then they were introduced into a sintering furnace to apply a sintering treatment by using a sintering pattern as shown in FIG. 1. In this treatment, the maximum temperature was 1940° C. However, the experiment was carried out from 1400° C.

As for obtained sintered compacts, the functionally gradient material was obtained for all of the combinations according to the third embodiment. However, in the case of the illustrative comparative sample, cracks, breakage, and deformation were conspicuous in all cases even when the temperature pattern and the pressure pattern were changed in various ways. Further, in the case of the illustrative comparative sample, non-sintered or green portions remained, and it was impossible to obtain those applicable to the use.

Table 15 shows the relationship between the maximum sintering temperature and the physical property values of the obtained sintered compacts.

TABLE 15

Physical properties of sintered compacts and maximum sintering temperatures

| Combination | Coefficient of thermal conductivity | Coefficient of thermal expansion | Resistance value | Maximum sintering temperature |
|---|---|---|---|---|
| 21-A | 180 W/mK | 7.2 × 10/° C. | >10 GΩ | 1780° C. |
| 21-B | 160 W/mK | 6.4 × 10/° C. | >10 GΩ | 1720° C. |
| 21-C | 180 W/mK | 6.8 × 10/° C. | >10 GΩ | 1580° C. |
| 22-A | 170 W/mK | 6.9 × 10/° C. | >10 GΩ | 1810° C. |
| 22-B | 160 W/mK | 6.5 × 10/° C. | >10 GΩ | 1620° C. |
| 22-C | 180 W/mK | 6.7 × 10/° C. | >10 GΩ | 1750° C. |
| Com. sample | immeasurable | immeasurable | immeasurable | 1500 to 1780° C. |

In Table 15, the resistance value represents the electric resistance of the ceramic part, which is expressed as ">10 GΩ" due to the limit of the measuring apparatus.

All of the sintered compacts had a thickness of the functionally gradient layer of 1.9 mm to 2.4 mm. All of the obtained functionally gradient materials were heated to 1600° C., and the pressure was applied with nitrogen gas up to 3.5 bar to hold this state for 30 minutes, followed by application of a heat treatment at 1200° C. for 1 hour.

Physical property values of the respective functionally gradient materials were measured. As a result, the thickness of the functionally gradient layer was decreased to be 1.6 mm to 2.0 mm, the strength of the ceramic part was increased to be about from Hv900 or less to Hv1200 or Hv1400, and the coefficient of thermal conductivity was also increased by about 10 to 15% to be 180 W/mK to 200 W/mK. The functionally gradient layer, the ceramic layer, and the metal layer were observed by using an electron microscope. As a result, the remaining pore was substantially zero, and no pore was observed in the functionally gradient layer as well. The added metal did not remain in the ceramic layer, only as much as not more than 5% of the added ceramic remained in the metal layer.

Next, the surface of the functionally gradient material obtained as described above was copper-metallized with a thickness of 0.3 mm. Subsequently, nickel plating was applied to the surface of copper so that the semiconductor chip was actually mounted to measure the heat characteristic at 45° C. On the other hand, an aluminum nitride substrate, which was presently used, was copper-metallized with a thickness of 0.3 mm in the same manner as described above, followed by application of nickel plating to mount the semiconductor Si chip so that a heat sink base made of pure copper was joined by soldering to give an illustrative comparative sample. Aluminum nitride of the illustrative comparative sample had a coefficient of thermal conductivity of 170 W/mK.

As a result, the heat sink-integrated type insulating substrate made of the functionally gradient material according to the third embodiment had an average coefficient of thermal conductivity of 160 W/mK to 180 W/mK. On the contrary, the illustrative comparative sample had an average coefficient of thermal conductivity of about 110 W/mK. Therefore, the functionally gradient material had the value about 1.5 times that of the illustrative comparative sample. Further, the illustrative comparative sample had a transient heat resistance of 0.17 K/W. On the contrary, the functionally gradient material had a transient heat resistance of 0.02 K/W to 0.03 K/W. The before, transient heat resistance was reduced to be about 1/10 as compared with the illustrative comparative sample.

In relation to a method for producing a functionally gradient material according to a fourth embodiment of the present invention, explanation will be made for a method for producing a heat sink-integrated type insulating substrate for constructing the semiconductor circuit substrate.

At first, material powder compositions of the metal part are shown in Table 16, and material powder compositions of the ceramic part are shown in Table 17.

TABLE 16

Material powder composition of metal part (%)

| | W | Cu | Al | AlN | Mg | Co | Ni | WC | Ag | TiH₄ | C |
|---|---|---|---|---|---|---|---|---|---|---|---|
| A1 | 19.4 | 3 | 7 | 35 | 0.2 | 2 | 0.3 | 30 | 0.1 | 2 | 1 |
| B1 | 29.4 | 5 | 5 | 30 | 0.2 | 2 | 0.3 | 25 | 0.1 | 2 | 1 |
| C1 | 45 | 7 | 3 | 20 | 0.2 | 1 | 0.2 | 19.5 | 0.1 | 3 | 1 |

TABLE 17

Material powder composition of ceramic part (%)

| | AlN | Al | Zr | Cr | WC | W | Ag | TiH₄ | LaH₃ |
|---|---|---|---|---|---|---|---|---|---|
| 31 | 80 | 15 | 1 | 1 | 1 | | 0.1 | 0.5 | 0.5 |
| 32 | 85.8 | 10 | 1 | 0.5 | 1 | 1 | | 0.5 | 0.2 |

In the fourth embodiment, the metal part layer and the ceramic part layer were constructed by single layers respectively to perform an experiment for producing the functionally gradient material by using the two-layered laminated compact.

On the other hand, an accumulated compact having a multiple layered structure obtained by gradually changing the components as having been hitherto performed was used as an illustrative comparative sample. A blending composition shown in Table 18 was used therefor.

TABLE 18

Powder composition based on ordinary method for forming gradient material (illustrative comparative sample) (%)

| | AlN | CaO | Y₂O₃ | Cu | W |
|---|---|---|---|---|---|
| a3 | 97 | 1 | 2 | | |
| b3 | 87.3 | 0.9 | 1.8 | 1.5 | 8.5 |
| c3 | 77.6 | 0.8 | 1.6 | 3.0 | 17.0 |
| d3 | 67.9 | 0.7 | 1.4 | 4.5 | 25.5 |
| e3 | 58.2 | 0.6 | 1.2 | 6.0 | 34.0 |
| f3 | 48.5 | 0.5 | 1.0 | 7.5 | 42.5 |
| g3 | 38.8 | 0.4 | 0.8 | 9.0 | 51.0 |
| h3 | 29.1 | 0.3 | 0.6 | 10.5 | 59.5 |
| i3 | 19.4 | 0.2 | 0.4 | 12.0 | 68.0 |
| j3 | 9.7 | 0.1 | 0.2 | 13.5 | 76.5 |
| k3 | 0 | 0 | 0 | 15 | 85 |

Accordingly, all of the powder compositions shown in Tables 16 to 18 were subjected to wet blending, and then respective combinations shown in Table 19 except for the illustrative comparative sample were used to perform molding at a pressure of 120 MPa by means of the isostatic pressing molding method, in which the ceramic part had a forming thickness of 2.5 mm, and the metal part had a forming thickness of 4 mm. In the illustrative comparative sample, the eleven layers were laminated while changing the composition by 10% for each of the layers. As for the ceramic part and the metal part, the layer "a" and the layer "k" in Table 18 had a thickness of 1 mm. The other layers had a thickness of 0.5 mm. Molding was performed by means of the isostatic pressing molding method. The en tire compact had a thickness of 6.5 mm.

It is noted that the isostatic pressing molding method is a method in which the uniformity of the molding pressure is excellent, and few defect occurs at the inside of the compact. In the case of the compacts according to the fourth embodiment, a yield of about 100% was obtained. on the contrary, in the case of the illustrative comparative sample composed of the eleven layers of the laminated compact, the peeling tended to occur at the boundary portion, and the yield had a low value of about 30%

Next, the compacts were subjected to a drying treatment at 50° C. for about 8 hours, and then they were introduced into a sintering furnace to apply a sintering treatment by using the sintering pattern as shown in FIG. 1. The maximum temperature was 1940° C. However, the experiment was carried out from 1400° C.

As for obtained sintered compacts, the functionally gradient material was obtained for all of the combinations according to the fourth embodiment. However, in the case of the illustrative comparative sample, cracks, breakage, and deformation were conspicuous in all cases even when the temperature pattern and the pressure pattern were changed in various ways. Further, in the case of the illustrative comparative sample, non-sintered or green portions remained, and it was impossible to obtain those applicable to the use.

Table 19 shows the relationship between the maximum sintering temperature and the physical property values of the obtained sintered compacts.

TABLE 19

Physical properties of sintered compacts and maximum sintering temperatures

| Combination | Coefficient of thermal conductivity | Coefficient of thermal expansion | Resistance Value | Maximum sintering temperature |
|---|---|---|---|---|
| 31-A1 | 190 W/mK | 6.2 × 10/° C. | >10 GΩ | 1930° C. |
| 31-B1 | 170 W/mK | 5.9 × 10/° C. | >10 GΩ | 1830° C. |
| 31-C1 | 200 W/mK | 6.4 × 10/° C. | >10 GΩ | 1710° C. |
| 32-A1 | 180 W/mK | 6.0 × 10/° C. | >10 GΩ | 1980° C. |
| 32-B1 | 160 W/mK | 5.8 × 10/° C. | >10 GΩ | 1870° C. |
| 32-C1 | 190 W/mK | 6.3 × 10/° C. | >10 GΩ | 1750° C. |
| Com. sample | immeasurable | immeasurable | immeasurable | 1500 to 1780° C. |

In Table 19, the resistance value represents the electric resistance of the ceramic part, which is expressed as ">10 GΩ" due to the limit of the measuring apparatus.

All of the sintered compacts had a thickness of the functionally gradient layer of 2.1 mm to 2.5 mm. All of the obtained functionally gradient materials were heated to 1700° C., and the pressure was applied with nitrogen gas up to 3.5 bar to hold this state for 30 minutes, followed by application of a heat treatment at 1200° C. for 1 hour.

Physical property values of the respective functionally gradient materials were measured. As a result, the thickness of the functionally gradient layer was decreased to be 1.7 mm to 2.1 mm, the strength of the ceramic part was increased to be about from Hv900 or less to Hv1200 or Hv1400, and the coefficient of thermal conductivity was also increased by about 10 to 15% to give a value exceeding 200 W/mK for all of them. The functionally gradient layer, the ceramic layer, and the metal layer were observed by using an electron microscope. As a result, the remaining pore was substantially zero, and no pore was observed in the functionally gradient layer as well. The added metal did not remain in the ceramic layer, only as much as not more than 5% of the added ceramic remained in the metal layer.

Next, the surface of the functionally gradient material obtained as described above was copper-metallized with a thickness of 0.3 mm. Subsequently, nickel plating was applied to the surface of copper so that the semiconductor chip was actually mounted to measure the heat characteristic at 45° C. On the other hand, an aluminum nitride substrate, which was presently used, was copper-metallized with a thickness of 0.3 mm in the same manner as described above, followed by application of nickel plating to mount the semiconductor Si chip so that a heat sink base made of pure copper was joined by soldering to give an illustrative comparative sample. Aluminum nitride of the illustrative comparative sample had a coefficient of thermal conductivity of 170 W/mK.

As a result, the heat sink-integrated type insulating substrate made of the functionally gradient material according to the fourth embodiment had an average coefficient of thermal conductivity of 190 W/mK to 210 W/mK. On the contrary, the illustrative comparative sample had an average coefficient of thermal conductivity of about 110 W/mK. Therefore, the functionally gradient material had the value about 2 times that of the illustrative comparative sample. Further, the illustrative comparative sample had a transient heat resistance of 0.17 K/W. On the contrary, the functionally gradient material h ad a transient heat resistance of 0.01 K/W to 0.02 K/W. Therefore, transient heat resistance was reduced to be about 1/10 as compared with the illustrative comparative sample.

Explanation will be made below for a method for producing a functionally gradient material according to a fifth embodiment of the present invention.

At first, a basic material powder composition of the metal part was a copper—tungsten alloy. A basic material powder composition of the ceramic part was aluminum nitride. A metal powder mixture and a ceramic powder mixture, which were set to have compositions shown in Table 20, were prepared.

TABLE 20

| | Metal part composition | Ceramic part composition |
|---|---|---|
| W | 45 | |
| Cu | 7 | |
| Al | 3 | 15 |
| AlN | 20 | 80 |
| Mg | 0.2 | 0.2 |
| Co | 1 | |
| Ni | 0.2 | |
| WC | 20 | 1 |
| Ag | 0.1 | 0.1 |
| TiH$_4$ | 3 | 0.5 |
| C | 0.5 | |
| Zr | | 1 |
| Cr | | 1 |
| LaH$_3$ | | 0.3 |

The metal powder mixture was blended with aluminum nitride (AlN) and tungsten carbide (WC) as ceramic component powders. The total weight of the ceramics was 40%. On the other hand, the ceramic powder mixture was blended with aluminum (Al), zirconium (Zr), chromium (Cr), and silver (Ag) as metal component powders. The total amount of the metal powders was 17.0%.

Next, the metal powder mixture and the ceramic powder mixture were treated as follows. That is, the thickness of the metal layer was 5 mm, and the thickness of the ceramic layer was 1.5 mm, and the two layers were laminated to give a size of 50 mm×50 mm after sintering to obtain a compact (hereinafter referred to as "illustrative experimental sample"). On the other hand, a compact (hereinafter referred to as "illustrative comparative sample") was obtained, in which the metal part composition was a copper—tungsten (8%–92%) alloy powder, and the ceramic part composition was aluminum nitride-yttrium oxide (98%–2%) powder so that ten layers were laminated while changing the composition by 10% for each of the layers.

Molding was performed by means of the isostatic pressing molding method in the respective cases. Molding was successfully performed with ease for the illustrative experimental sample. However, in the case of the illustrative comparative sample, peeling occurred between the compositions after molding, and only one obtained sample was applicable to the test, of 20 molded samples. In the case of the illustrative comparative sample, it was difficult to uniformly maintain the thickness of the respective layers. For this reason, the thickness after sintering was about 15 mm.

Figure 2:
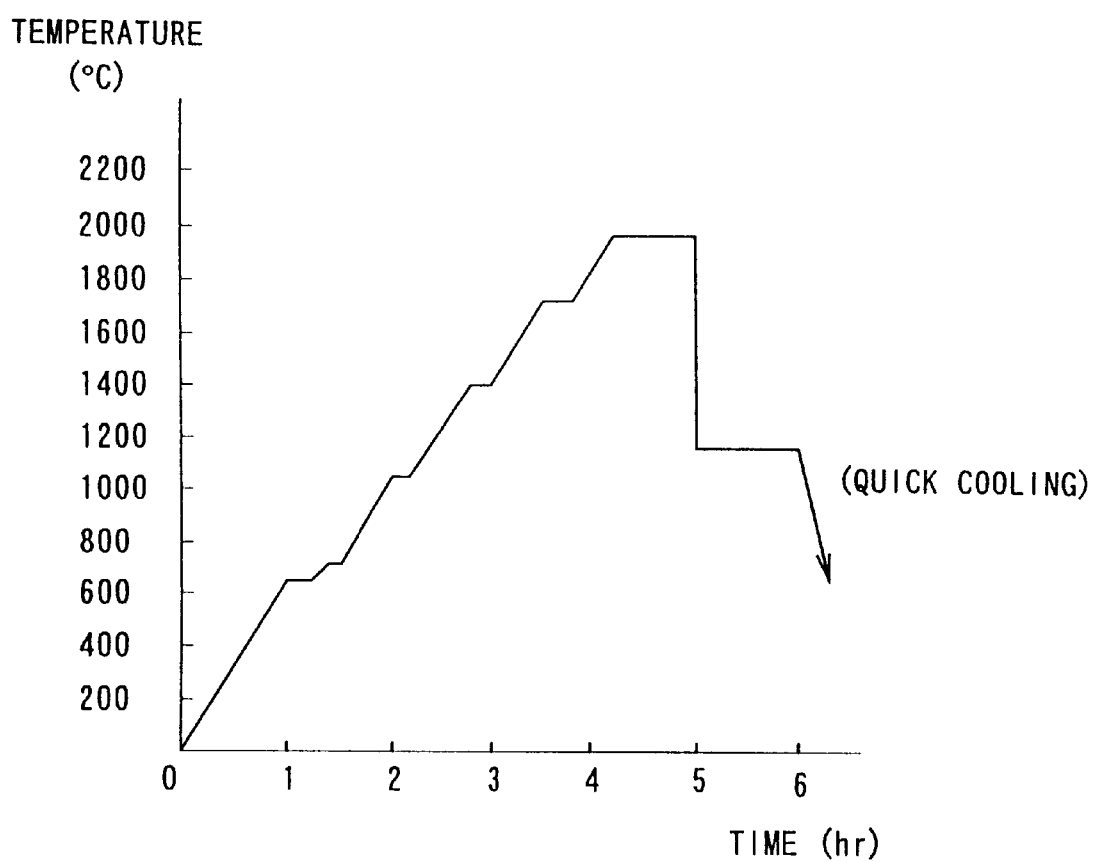
FIG. 2 illustrates a sintering pattern employed in a method for producing a functionally gradient material according to a fifth embodiment of the present invention.

A sintering treatment was applied to the illustrative experimental sample and the illustrative comparative sample by using a sintering pattern as shown in FIG. 2. The maximum sintering temperature for the illustrative experimental sample was 1980° C., which was in a state of temperature fairly higher than the sintering temperature range conceived from the composition. During the sintering process, the sintering atmosphere was adjusted so that the pressure was about 5 Pa in a reduced-pressure state in a region in which the temperature was relatively low while allowing the nitrogen gas to flow, and the nitrogen pressure was raised to 1 atmosphere and to 2 atmospheres in accordance with the increase in temperature.

Sintering was tried to be performed for the illustrative comparative sample up to 1800° C. while raising the temperature from 1200° C. by every 100° C. However, even at a low temperature of 1200° C., breakage and cracks occurred due to interface peeling and warpage at the boundary between the laminated layers. Therefore, it was impossible to merely construct any fragment of the functionally gradient material. Even when the experiment was performed while changing, for example, the pressure condition from vacuum to a pressure less than 10 atmospheres, it was impossible to obtain any shape applicable to the following experiment.

On the other hand, it was successfully confirmed for the illustrative experimental sample that the contraction temperature was lowered owing to the sintering in vacuum, and the contraction occurred in a great degree at about 1600° C. or less to advance the densification. Subsequently, the metal layer and the ceramic layer, which were both end surfaces of the functionally gradient material obtained as described above, were polished. The cross section was cut to perform mirror-finishing treatment. After that, a continuity test and an experiment for measuring the hardness of the cross section were performed.

At first, in the continuity test, the resistance of the metal layer was approximately zero, and those observed were merely in a degree of terminal contact resistance. On the contrary, when the continuity test was performed for all portions of the ceramic layer, a value of not less than 100 MΩ was obtained for the all portions. The value exceeded the capacity of the measuring apparatus.

Figure 3:
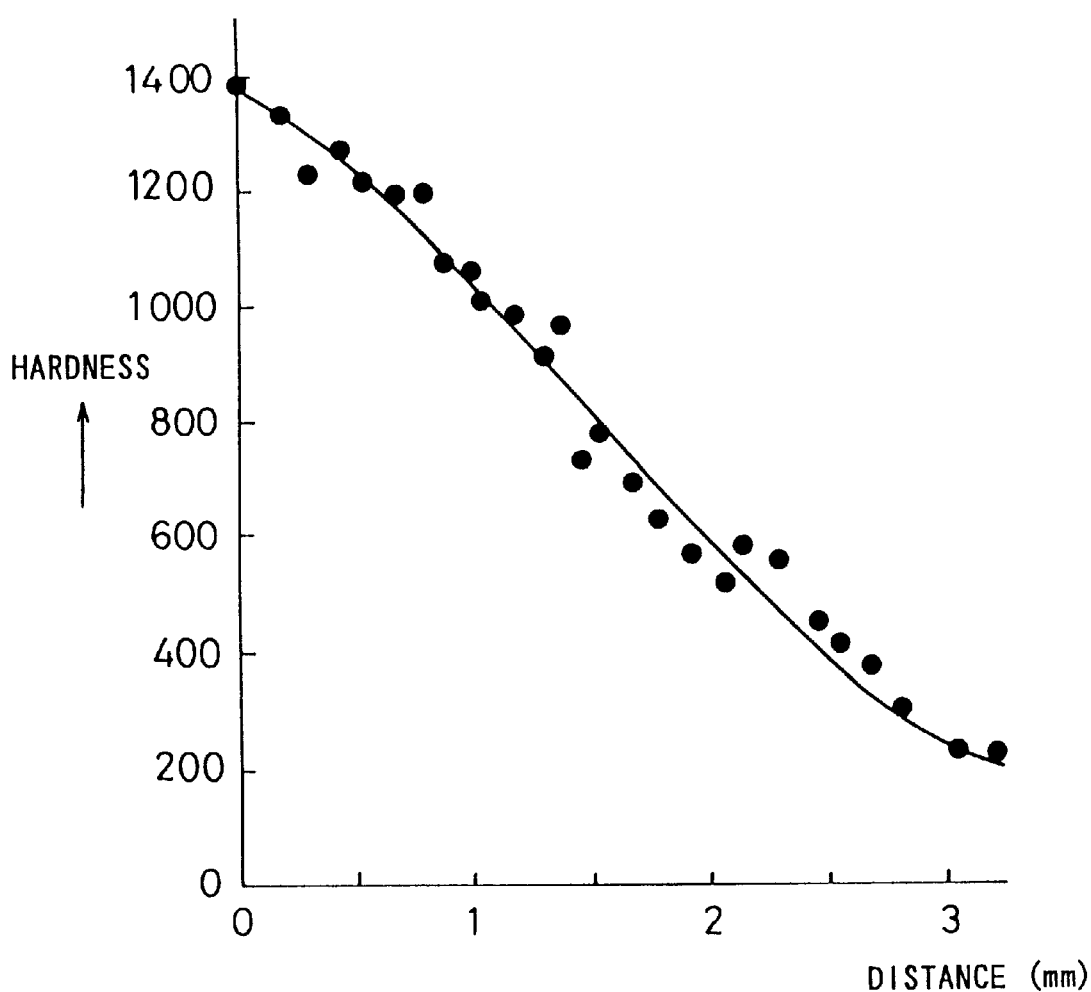
FIG. 3 shows a relationship between the hardness and the distance from the ceramic part to the metal part of the functionally gradient material.
Figure 4:
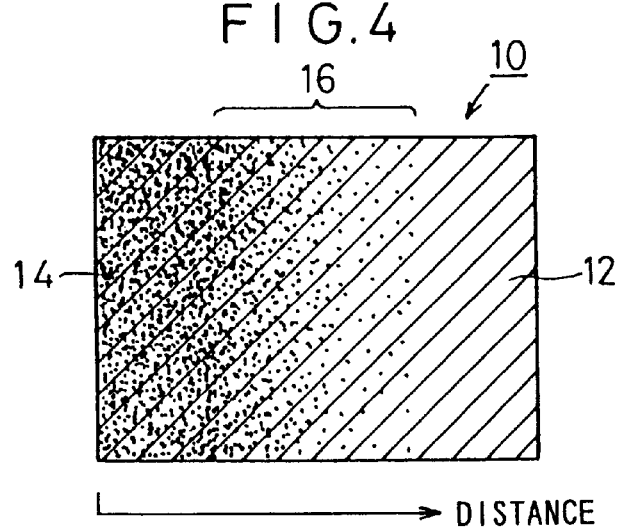
FIG. 4 shows a longitudinal sectional view illustrating the functionally gradient material.

FIG. 3 shows a result of measurement of the hardness Hv at respective portions of the obtained functionally gradient material. That is, as shown in FIG. 4, the functionally gradient material 10 had one end surface which was the metal layer 12, and the other end surface which was the ceramic layer 14. The functionally gradient material 10 included, at its inside, the diffusion layer 16 in which the metal and the ceramic were mutually diffused. The side of the ceramic layer 14 was scraped off in an amount of 0.5 mm, and the hardness was measured in a direction from the ceramic layer 14 to the metal layer 12.

As a result, as shown in FIG. 3, it was revealed that a hard layer composed of ceramic was disposed in a region of about 0.5 mm from the ceramic layer 14, and the hardness was smoothly decreased therefrom. The width of the diffusion layer 16 as the gradient layer was as much as about 2 mm. A large difference existed in the hardness Hv of about 1200 to 200.

Even when microscopic observation was performed by using an electron microscope, no defect such as cracks and pores was observed at all between the ceramic layer 14 and the metal layer 12. It was confirmed that the desired functionally gradient material 10 having a high quality was produced. Even when the ceramic layer 14 was scraped up to a depth of 0.5 mm, the existence of metal was not found even by means of microscopic observation. It was confirmed that the ceramic layer 14 was substantially 100% ceramic.

Next, a sixth embodiment of the present invention was carried out. The experiment was performed by using silicon nitride as a base ceramic for the ceramic part composition and using an nickel alloy as a base metal for the metal part composition. The metal part composition and the ceramic part composition are shown in Table 21.

TABLE 21

|  | Metal part | Ceramic part |
| --- | --- | --- |
| Ni | 57.5 | 0.3 |
| Cr | 9 | 0.5 |
| Co | 13.2 |  |
| Mo | 1 | 0.2 |
| Al | 1.3 | 3.0 |
| Ti | 1 | 2.3 |
| V | 1 |  |
| AlN | 7.5 |  |
| TiN | 5.5 |  |
| ZrC | 0.2 |  |
| C | 0.5 | 0.3 |
| $Si_3N_4$ |  | 85 |
| Si |  | 7 |
| $Y_2O_3$ |  | 1.4 |
| $Mo_2C$ | 3.3 |  |

In this embodiment, the metal powder mixture was blended with 16.5% of the ceramic powder, and the ceramic powder mixture was blended with 13.3% of the metal powder. The ceramic powder mixture and the metal powder mixture were laminated so that the thickness on the side of the ceramic powder mixture was 3 mm, and the thickness on the side of the metal powder mixture was 3 mm.

Subsequently, the laminated material was molded by means of the isostatic pressing molding method to obtain a compact of 60 mm×60 mm. During this process, a solvent of alcohol:acetone of 3:1 was used, and the molding pressure was set to be 120 MPa.

The compact was dried, and then it was sintered with a maximum temperature of 1780° C. This temperature greatly exceeded the melting point of the super heat resistant alloy composition as the nickel alloy. However, the sintered compact obtained after the sintering maintained its shape, and it was densified. Thus, the functionally gradient material was constructed.

The functionally gradient material after the sintering was observed for its portion in the vicinity of the boundary, the metal layer, and the ceramic layer by using, for example, an electron microscope. As a result, few defects were observed, and the densification was achieved by 100% including the gradient layer.

In the same manner as the illustrative experimental sample, the ceramic layer was removed by polishing in an amount corresponding to 0.5 mm from the outermost surface. After that, an electric continuity test was carried out. As a result, the resistance of not less than 100 MΩ was observed at every point. Thus, it was found that high insulation performance was obtained. When the cross section was observed by using, for example, an electron microscope, the presence of metal was observed in the gradient layer, however, the presence of metal was not confirmed at all in the ceramic layer.

Further, the hardness was measured in the same manner as the illustrative experimental sample to confirm, for example, the width of the gradient layer. As a result, the thickness of the ceramic layer completely converted into ceramic was 1.6 mm, and the thickness of the metal layer completely converted into metal was about 1.3 mm. The thickness of the gradient layer was about 1.2 mm. Although the densification was advanced in the obtained functionally gradient material, the contraction did not arrive at a degree exceeding 20%, unlike those composed of ceramic alone or composed of metal alone.

What is claimed is:

1. A method for producing a functionally gradient material composed of a ceramic part composition and a metal part composition, comprising the steps of:
    selecting a ceramic part material and a metal part material adjusted so that coefficients of thermal expansion of a composition portion of 100% of ceramic and a composition portion of 100% of metal satisfy: (coefficient of thermal expansion of ceramic composition portion)/(coefficient of thermal expansion of metal composition portion)×100=75 to 125 (%); and
    laminating said ceramic part material and said metal part material, and mutually diffusing components of said both materials by means of a simultaneous sintering treatment to produce said functionally gradient material.

2. The method for producing said functionally gradient material according to claim 1, wherein:
    said ceramic composition portion comprises aluminum nitride; and
    said metal composition portion comprises copper and tungsten.

3. The method for producing said functionally gradient material according to claim 1, wherein:
    said ceramic part material comprises metallic aluminum to be converted into aluminum nitride by a nitriding treatment; and
    aluminum nitride and another additive or other additives of at least one selected from the group consisting of zirconium, tungsten, tungsten carbide, tungsten nitride, molybdenum carbide, chromium, and alumina are added to said metallic aluminum upon said nitriding treatment.

4. The method for producing said functionally gradient material according to claim 3, wherein said metallic aluminum, said aluminum nitride, and said another additive or said other additives are set to be in a composition ratio of metallic aluminum: aluminum nitride: another additive or other additive=8 to 25:74 to 87:1 to 12.

5. The method for producing said functionally gradient material according to claim 1, wherein said ceramic part material and said metal part material are set to have an identical sintering temperature.

6. A method for producing a functionally gradient material comprising the steps of:
    mixing the following material powders to mold a compact:
        a metal part material powder set to have a composition comprising 15% to 75% of molybdenum, 3% to 20% of copper, 2% to 10% of aluminum, 3% to 30% of aluminum nitride, not more than 0.3% of magnesium, 0.5% to 5% of cobalt, not more than 0.5% of nickel, 5% to 30% of molybdenum carbide, not more than 0.3% of silver, and 0.1% to 5% of carbon; and
        a ceramic part material powder set to have a composition comprising 70% to 90% of aluminum nitride, 5% to 25% of aluminum, not more than 3% of zirconium, not more than 2% of chromium, not more than 3% of tungsten carbide, not more than 2% of molybdenum, and not more than 1% of carbon; and
    applying a sintering treatment to said compact to obtain said functionally gradient material composed of a metal composition layer and a ceramic composition layer disposed in an integrated manner with a functionally gradient layer composed of a mixture thereof and interposed therebetween.

7. The method for producing said functionally gradient material according to claim 6, wherein a hydride is added within a range of 0.1% to 5% to said mixed powder of said metal part material powder and said ceramic part material powder.

8. The method for producing said functionally gradient material according to claim 7, wherein said hydride is selected from the group consisting of titanium hydride, zirconium hydride, hafnium hydride, yttrium hydride, and hydride of lanthanum series element.

9. The method for producing said functionally gradient material according to claim 6, wherein said sintering treatment is performed under a condition in which a sintering temperature is within a range of 1430° C. to 1850° C. in a nitrogen atmosphere.

10. The method for producing said functionally gradient material according to claim 6, wherein a controlled atmosphere heat treatment is applied after said sintering treatment so that said ceramic in said metal composition layer is converted into metal, and said metal in said ceramic composition layer is converted into ceramic.

11. The method for producing said functionally gradient material according to claim 6, wherein said metal composition layer constructs a heat sink, while a semiconductor circuit is formed on said ceramic composition layer.

12. A method for producing a functionally gradient material comprising the steps of:
    mixing the following material powders to mold a compact:
        a metal part material powder set to have a composition comprising 15% to 75% of tungsten, 3% to 20% of copper, 2% to 10% of aluminum, 3% to 30% of aluminum nitride, not more than 0.3% of magnesium, 0.5% to 5% of cobalt, not more than 0.5% of nickel, 5% to 40% of tungsten carbide, not more than 0.3% of silver, and 0.1% to 5% of carbon; and a ceramic part material powder set to have a composition comprising 70% to 90% of aluminum nitride, 5% to 25% of aluminum, not more than 3% of zirconium, not more than 2% of chromium, not more than 3% of tungsten carbide, not more than 2% of tungsten, and not more than 1% of carbon; and applying a sintering treatment to said compact to obtain said functionally gradient material composed of a metal composition layer and a ceramic composition layer disposed in an integrated manner with a functionally gradient layer composed of a mixture thereof and interposed therebetween.

13. The method for producing said functionally gradient material according to claim 12, wherein a hydride is added within a range of 0.1% to 5% to said mixed powder of said metal part material powder and said ceramic part material powder.

14. The method for producing said functionally gradient material according to claim 13, wherein said hydride is selected from the group consisting of titanium hydride, zirconium hydride, hafnium hydride, yttrium hydride, and hydride of lanthanum series element.

15. The method for producing said functionally gradient material according to claim 12, wherein said sintering treatment is performed under a condition in which a sintering temperature is within a range of 1480° C. to 2000° C. in a nitrogen atmosphere.

16. The method for producing said functionally gradient material according to claim 12, wherein a controlled atmosphere heat treatment is applied after said sintering treatment so that said ceramic in said metal composition layer is converted into metal, and said metal in said ceramic composition layer is converted into ceramic.

17. The method for producing said functionally gradient material according to claim 12, wherein said metal composition layer constructs a heat sink, while a semiconductor circuit is formed on said ceramic composition layer.

18. A method for producing a functionally gradient material comprising the steps of:

preparing a metal powder mixture obtained by adding a ceramic component to a metal part composition and a ceramic powder mixture obtained by adding a metal component to a ceramic part composition;

laminating said metal powder mixture and said ceramic powder mixture to obtain a compact; and applying a sintering treatment to said compact so that said ceramic component added to said metal part composition is converted into metal, and said metal component added to said ceramic part composition is converted into ceramic to produce said functionally gradient material.

19. The method for producing said functionally gradient material according to claim 18, wherein:

said metal part composition contains not less than 50% of any one of copper alloy, iron alloy, nickel alloy, cobalt alloy, and aluminum alloy; and said ceramic part composition contains not less than 50% of any one of aluminum nitride, silicon nitride, titanium nitride, zirconium nitride, silicon carbide, titanium carbide, zirconium carbide, titanium boride, and zirconium boride.

20. The method for producing said functionally gradient material according to claim 18, wherein:

said ceramic component added to said metal part composition is any one of carbides, nitrides, and oxides of elements of the group III including lanthanum series elements, elements of the group IV, elements of the group V, and elements of the group VI, and mixtures thereof; and said metal component added to said ceramic part composition is any one elements of the group III including lanthanum series elements, elements of the group IV, elements of the group V, and elements of the group VI, and mixtures thereof.

* * * * *